Figure 1:
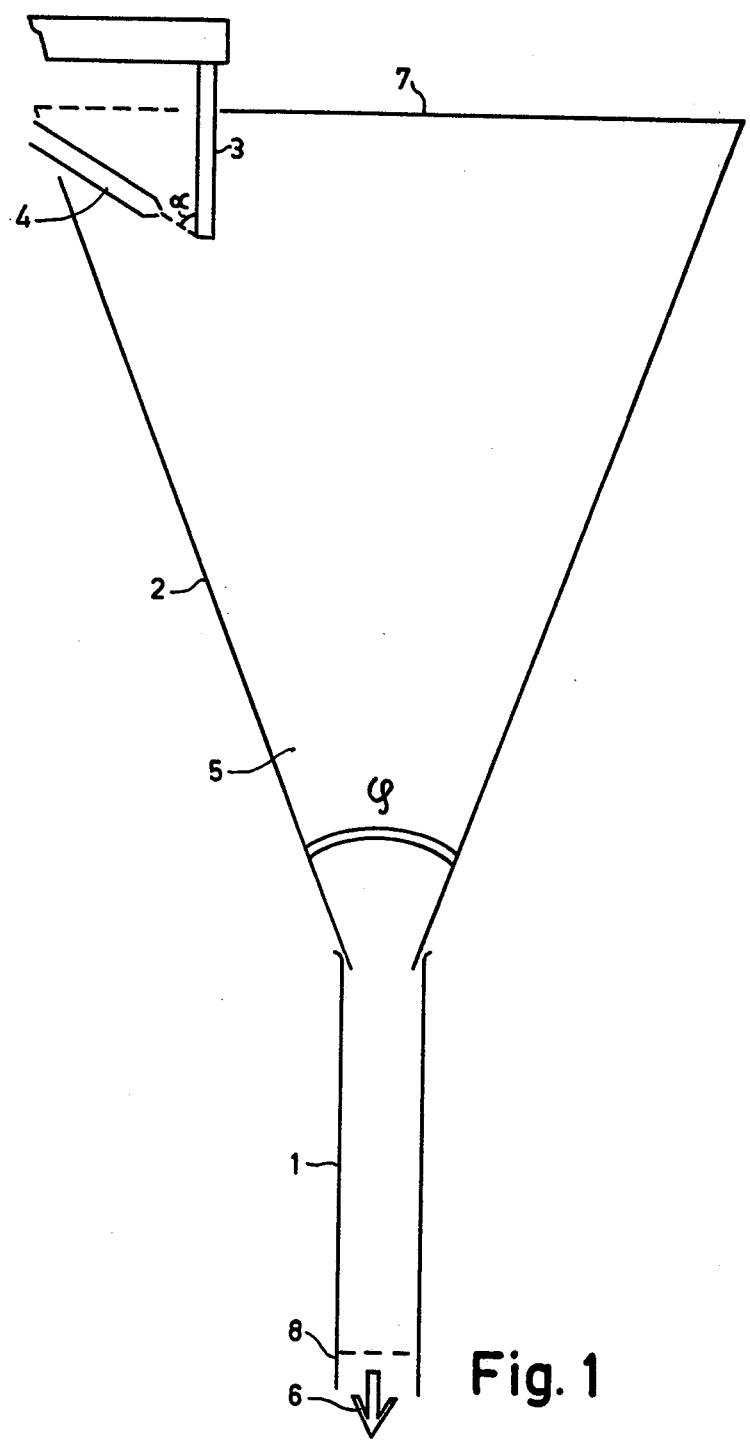

United States Patent [19]

van Esdonk et al.

[11] 4,101,185

[45] Jul. 18, 1978

[54] METHOD FOR PRODUCING A LOW-PRESSURE GAS DISCHARGE LAMP

[75] Inventors: Johannes van Esdonk; Jan Hasker; Johannes Cornelis Gerardus Vervest, all of Eindhoven, Netherlands

[73] Assignee: U.S. Philips Corporation, New York, N.Y.

[21] Appl. No.: 764,588

[22] Filed: Feb. 1, 1977

[30] Foreign Application Priority Data

Mar. 18, 1976 [NL] Netherlands ............................ 7602824

[51] Int. Cl.² ................................................ H01J 9/18
[52] U.S. Cl. ...................................... 316/19; 29/25.13; 316/17
[58] Field of Search .................. 65/8, 2, 6; 29/25.11, 29/25.13; 316/19, 17, 1

[56] References Cited

U.S. PATENT DOCUMENTS

| 2,294,588 | 9/1942 | Pazsiczky | 65/8 |
| 2,916,773 | 12/1959 | Vonnegut | 65/8 |

Primary Examiner—Richard B. Lazarus
Attorney, Agent, or Firm—Frank R. Trifari; Robert S. Smith

[57] ABSTRACT

A method of producing a low-pressure gas discharge lamp in which a body of a solid material having a thin, structure of filaments permeable to the gas discharge such as glass wool is disposed. Coherence is given to the filaments by compressing them whereafter they are sucked into the lamp envelope. Compressing, knitting together and producing the wire-shaped elements is done in a funnel-shaped space which is connected at its constricted side to the tubular discharge space.

14 Claims, 2 Drawing Figures

METHOD FOR PRODUCING A LOW-PRESSURE GAS DISCHARGE LAMP

The invention relates to a method for producing a low-pressure gas and/or vapour discharge lamp having a tubular discharge space in which a body comprising filaments of a solid material and permeable to the gas discharge is disposed. As described in Dutch Patent Application Nr. 7409366 which as been laid open to public inspection the luminous flux per unit of lamp volume of low-pressure discharge lamps, low-pressure sodium and low-pressure mercury vapour discharge lamps in particular, can be increased at a high system efficiency by disposing said body in the discharge space, between the electrodes. In this respect system efficiency must be understood to mean the efficiency in lumen per watt of the combination of the lamp and the indispensable ballast circuit. A condition for a high luminous flux of such lamps is that said body is thinly distributed over the entire discharge space. A practical realization of such a body in a low-pressure discharge lamp may consist of coherent wire-shaped elements or filaments, such as, for example, glass wool.

In order to realize a high luminous flux the quantity of material per unit volume must satisfy certain conditions, as is also described in the above-mentioned Dutch Patent Application Nr. 7409366. If the body is too densely packed then no stable discharge can built up and if the body is too thinly packed no worthwhile effect will be produced.

When producing the above-mentioned discharge lamps, disposing the body in the discharge space while satisfying the above-mentioned conditions is a difficult matter. The wire-shaped elements from which the body is constructed are generally flexible and easily deformable so that local concentrations and inhomogeneities can easily occur in the structure which increases the risk for an non-uniform temperature distribution on the wall enclosing the discharge space. Such a non-uniform temperature distribution results in low-pressure mercury vapour discharge lamps having a luminescent layer in mercury deposit on the colder portions of the luminescent material and in low-pressure sodium vapour discharge lamps in the formation of sodium mirrors in colder spots.

French Patent Specification Nr. 906,948 discloses a lamp whose discharge space is provided with glass wool and summarily describes a manner in which said glass wool can be introduced into the discharge space, namely by preshaping the glass wool into loose balls or wads prior to placing it within the lamp envelope. The drawback of this method is that within the balls or wads the structure is not sufficiently loosely pocked and, furthermore, is inhomogeneous, while interspaces are created between the individual wads or balls, in which there is no glass wool. This inhibits a uniform and stable build-up of the discharge.

A method of producing a low-pressure gas discharge lamp of the type mentioned in the preamble is characterized in that in a space which is connected to the tubular discharge space coherence is given to the filaments by means of a gas current, while being whirled around whereafter they are sucked into the discharge space.

Owing to the whirling action the filaments properly engage which produces a good coherence of the filaments. By controlling the force of suction the concentration of the wire-shaped elements and consequently the packing density of the body in the lamp are influenced. By combining these measures a lamp is obtained having a discharge space in which there is a body having a sufficiently thinly packed structure which is evenly distributed over the volume and which does not sag.

A special embodiment of a method according to the invention is characterized in that the coherence is given in a funnel-shaped space which is connected at the constricted side to the tubular discharge space.

The advantage of the funnel-shaped space is that the filament concentration can take place very gradually because the space into which the elements are sucked by the suction current becomes increasingly narrower. Near the point where the diameter of the constricted end of the funnel is as large as the diameter of the lamp envelope the coherence of the elements is optimum.

The size of the funnel angle should be chosen very carefully, preferably smaller than 90°. The smaller the filament diameter the more acute the funnel angle is chosen and the better the filling process is performed.

A practical realization of the body in a low-pressue gas discharge lamp may consist of filament wool, such as glass wool, for example, gehlenite glass wool or quartz glass wool. The filaments from which the glass wool is constructed preferably consist of glass having a diameter smaller than 100 $\mu$m. These glass filaments may be produced in the funnel-shaped space.

The filaments may be produced by locally heating the end of a glass rod which rapidly rotates around its longitudinal axis in such a way that the filaments of glass are flung in one place from the rod. The end of the rod is heated by means of a pointed flame directed on to the rod. Flinging of the filaments away from one place at the same time is influenced by the rotational speed of the rod, the angle between the pointed flame and the rod and the diameter of the rod. Suitable values for the rotational speed are between 1000 revs/minute and 5000 revs/minute, for the angle are between 30° and 70°, and for the diameter are between 1 mm and 10 mm. Flinging away in one place is a condition for shaping the desired thin body. It appeared namely, that if this flinging action occurs in more places simultaneously rather a lot of ball-shaped elements are produced in the glass wool which is not wanted for the use in the lamps.

The procedure of introducing the structure into the discharge space proceeds well if the funnel-shaped space is substantially closed at the wide side. Unwanted air currents are then prevented.

Another suitable method for producing wire-shaped elements of glass is flinging the glass from a hole in the circumference of a rapidly rotating crucible filled with molten glass. Also with this method no balls are formed in the wool. An additional advantage is that the thickness of the flung-out filaments has a very small spread. In a practical embodiment said crucible may consist of metal which is heated inductively.

It is advantageous that the place where the thread-shaped elements are flung out is near the edge at the wide side of the funnel. The process with which the coherence and the concentration of the thread-shaped elements is obtained then proceeds very uniformly.

The invention will now be further explained with reference to a drawing which shows diagrammatically two embodiments of a method according to the invention.

Figure 2:
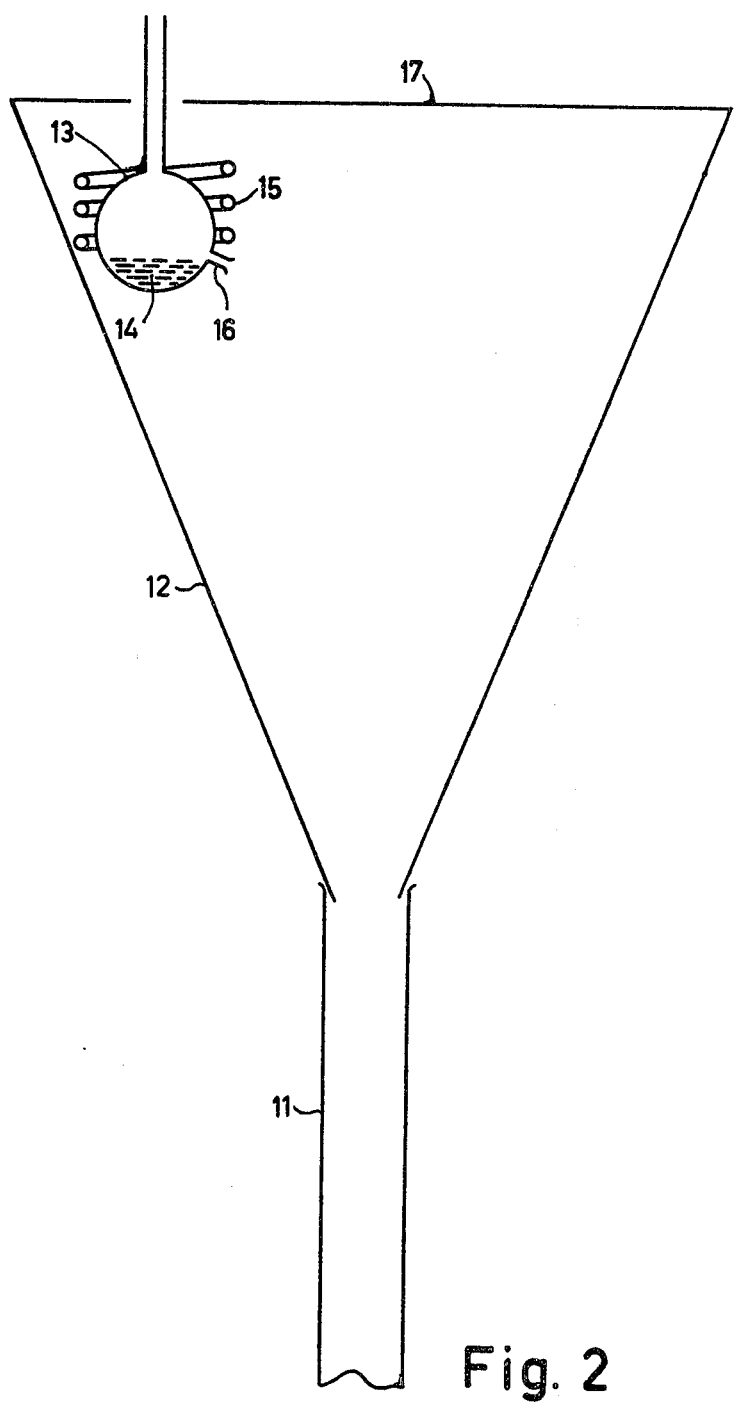

In the drawing FIG. 1 shows an embodiment of a method according to the invention in which use is made of a glass rod for producing the glass filaments, and FIG. 2 shows an embodiment in which use is made of a crucible filled with molten glass for ejecting the filaments.

In FIG. 1 a tubular lamp envelope which is to be filled with glass wool is indicated by reference 1. In the wider end of the funnel-shaped space 2 is disposed a glass rod 3 which rapidly rotates around its longitudinal axis. The bottom end of this rod as viewed in the figure is heated by means of a "pencil" burner 4 which produces a needle flame, represented by a broken line. The distance from the burner nozzle to the bottom end of the rod is approximately 7 cm, whilst the burner angle α between the burner 4 and the rod 3 is between approximately 40° and 60°. When a glass rod of the composition by weight 68.7% $SiO_2$, 2.9% $B_2O_3$, 9.0% $Na_2O$, 10.8% $K_2O$, 7.0% BaO, 1.5% $Al_2O_3$ and 0.1% SrO and 3 mm thick is used the supply of gas and oxygen to the burner, at a speed of 3000 revolutions per minute and a feed rate of the rod in the direction of the longitudinal axis of 2 cm per minute is adjusted such that the filaments of said glass are thrown off which are approximately 20 μm thick. If the number of revolutions of the rod is decreased the filaments get thicker. At approximately 2000 revolutions per minute they are approximately 50 μm thick. For said glass, after ejection, filaments are obtained which have an average length of approximately 6 cm. In portion 5 of the funnel coherence is given to the filaments to a structure of glass wool which becomes gradually denser and which is thereafter sucked into the tubular lamp envelope 1 by a gas current 6. The abovementioned process proceeds well if the funnel angle φ is equal to 20° and the top of the funnel is substantially closed by a plate 7 to prevent unwanted air currents. The diameter of the wide end of the funnel is approximately 40 cm at a funnel angle of 20° and a funnel height of 90 cm. To prevent the glass wool from penetrating the suction pump owing to the force of suction of the gas current a sieve 8 is disposed in the lamp envelope. To enable reproducible filling of several lamp envelopes, the burner is switched off and the feed forward of the rod is stopped for each lamp envelope after a fixed time interval, the length of which depends on the quantity of glass wool which must be brought into the lamp envelope.

In this manner tubular discharge lamps have been produced having a length of approximately 55 cm and a diameter of 38 mm and containing 140 mg of wool of glass of the abovementioned composition, the diameter of the wire filaments being approximately 35 μm. The efficiency of these lamps, whose iner wall was coated with a luminescent layer of manganese- or antimony-activated calcium halophosphate, was 75 lm/W at a power of 40 W.

In FIG. 2 the tubular lamp envelope is indicated by 11 and the funnel by 12. To produce glass filaments use is made of a quartz crucible 13 filled with molten glass 14 having a composition by weight of 68.7% $SiO_2$, 2.9% $B_2O_3$, 9.0% $Na_2O$, 10.8% $K_2O$, 7.0% BaO, 1.5% $Al_2O_3$ and 0.1% SrO. The crucible is heated inductively by means of a coil 15. By rotating the crucible at a speed of 4000 revolutions per minute 20 μm glass filaments are obtained from a tubular channel 16 which has a length of 5 mm and a diameter of 0.4 mm. The top opening of the funnel is again substantially closed by means of a cover 17.

We claim:

1. A method for producing a low-pressure discharge lamp which comprises: providing a lamp envelope, said envelope including walls defining a tubular discharge space, providing a body comprising filaments of solid material elements, said body being permeable to a gas discharge, providing coherence to said filaments in a second space adjacent to said tubular discharge space by subjecting said filaments to a gas current and by whirling said filaments, then sucking said filaments into said discharge space, and completing the manufacture of said lamp.

2. A method as claimed in claim 1 further includes: providing a funnel shaped member defining said second space, said funnel shaped member being constricted at one end and in fluid communication with said discharge space, said providing coherence step of the filaments is given in a funnel-shaped space whose constricted end is connected to the tubular discharge space.

3. A method as claimed in claim 2 further including the step of producing said filaments in said funnel-shaped space.

4. A method as claimed in claim 2 wherein said funnel-shaped space has a funnel angle which is smaller than 90°.

5. A method as claimed in claim 4 wherein said funnel angle is between 15° and 25°.

6. A method as claimed in claim 1 wherein said filaments are less than 100 microns thick and consist of glass.

7. A method as claimed in claim 2 wherein said funnel-shaped member is closed for a substantial part of the widest face thereof.

8. A method as claimed in claim 3 wherein said filaments are produced by locally heating the bottom side of a glass rod, rotating rapidly said rod around its longitudinal axis in such a way that the filaments are flung from the rod in one place.

9. A method as claimed in claim 8 wherein said heating step is done by means of a pointed flame which is directed to the bottom side of said glass rod at an angle of 30° to 70°.

10. A method as claimed in claim 8 wherein the rotational speed of the rod is between 1000 and 5000 revolutions per minute.

11. A method as claimed in claim 8 wherein the diameter of said rod is between 1mm and 10mm.

12. A method as claimed in claim 3 wherein said filaments of glass are produced by ejection from a hole in a rotating crucible filled with molten glass.

13. A method as claimed in claim 12 wherein said crucible is made of metal and is heated inductively.

14. A method as claimed in claim 3 wherein the place where the filaments are produced is near the edge of the wide side of said funnel-shaped space.

* * * * *